United States Patent
Peterson et al.

(10) Patent No.: US 10,884,179 B2
(45) Date of Patent: Jan. 5, 2021

(54) ELECTRONIC DEVICE WITH LIGHT-GENERATING SOURCES TO ILLUMINATE AN INDICIUM

(71) Applicant: Rohinni, LLC, Coeur d'Alene, ID (US)

(72) Inventors: Cody Peterson, Hayden, ID (US); Andrew Huska, Liberty Lake, WA (US)

(73) Assignee: Rohinni, LLC, Coeur d'Alene, ID (US)

( * ) Notice: Subject to any disclaimer, the term of this patent is extended or adjusted under 35 U.S.C. 154(b) by 0 days.

(21) Appl. No.: 16/200,384

(22) Filed: Nov. 26, 2018

(65) Prior Publication Data

US 2019/0094453 A1 Mar. 28, 2019

Related U.S. Application Data

(63) Continuation of application No. 14/941,442, filed on Nov. 13, 2015, now Pat. No. 10,139,551.

(60) Provisional application No. 62/080,221, filed on Nov. 14, 2014.

(51) Int. Cl.
*F21V 8/00* (2006.01)
*G09F 13/08* (2006.01)
*G09F 23/00* (2006.01)
*G06F 1/16* (2006.01)
*G06F 1/18* (2006.01)
(Continued)

(52) U.S. Cl.
CPC ......... *G02B 6/0073* (2013.01); *G02B 6/0043* (2013.01); *G02B 6/0063* (2013.01); *G06F 1/00* (2013.01); *G06F 1/1656* (2013.01); *G06F 1/181* (2013.01); *G09F 13/08* (2013.01); *G09F 23/00* (2013.01); *G09F 2013/222* (2013.01)

(58) Field of Classification Search
CPC .. G02B 6/0073; G02B 6/0043; G02B 6/0063; G06F 1/00; G06F 1/1656; G06F 1/181; G09F 13/08; G09F 23/00; G09F 2013/222
USPC ....................................................... 362/23.12
See application file for complete search history.

(56) References Cited

U.S. PATENT DOCUMENTS

| 6,577,080 B2 | 6/2003 | Lys et al. |
| 7,646,029 B2 | 1/2010 | Mueller et al. |
| 2006/0133061 A1 | 6/2006 | Maeda |

(Continued)

FOREIGN PATENT DOCUMENTS

| CN | 201237100 Y | 5/2009 |
| CN | 101625074 A | 1/2010 |

(Continued)

OTHER PUBLICATIONS

Office Action for U.S. Appl. No. 15/046,168, dated Feb. 1, 2018, Cody Peterson, "Indicium Illumination", 15 pages.

(Continued)

*Primary Examiner* — Cara E Rakowski
*Assistant Examiner* — Hana S Featherly
(74) *Attorney, Agent, or Firm* — Lee & Hayes, P.C.

(57) ABSTRACT

An apparatus includes a first display, an indicium, and a second display. The second display can include a light-generating source deposited on a substrate. The second display illuminates the indicium and the second display has a thickness of less than 0.25 millimeters. The apparatus also includes one or more controllers communicatively coupled to the first display and the second display and configured to control states of the first display and the second display.

20 Claims, 10 Drawing Sheets

(51) Int. Cl.
  *G06F 1/00* (2006.01)
  *G09F 13/22* (2006.01)

(56) References Cited

U.S. PATENT DOCUMENTS

| | | | |
|---|---|---|---|
| 2007/0188404 A1* | 8/2007 | Cha | G06F 1/1616 345/1.1 |
| 2009/0033512 A1 | 2/2009 | Tonry et al. | |
| 2011/0163683 A1 | 7/2011 | Steele et al. | |
| 2011/0316448 A1 | 12/2011 | Ashdown | |
| 2012/0050975 A1 | 3/2012 | Garelli et al. | |
| 2012/0106141 A1 | 5/2012 | Dotson | |
| 2012/0206919 A1* | 8/2012 | Chu | G06F 3/03547 362/296.01 |
| 2013/0241918 A1 | 9/2013 | Satyan | |
| 2013/0264588 A1 | 10/2013 | Liu et al. | |
| 2014/0335832 A1 | 11/2014 | Yu et al. | |
| 2015/0171289 A1 | 6/2015 | Solgat et al. | |
| 2015/0179141 A1 | 6/2015 | Dabhi | |
| 2015/0341901 A1 | 11/2015 | Ryu et al. | |
| 2016/0138790 A1 | 5/2016 | Peterson et al. | |
| 2016/0203742 A1 | 7/2016 | Peterson et al. | |
| 2020/0160762 A1 | 5/2020 | Peterson et al. | |

FOREIGN PATENT DOCUMENTS

| | | |
|---|---|---|
| CN | 103017017 A | 4/2013 |
| CN | 204005336 U | 12/2014 |
| CN | 104869252 A | 8/2015 |

OTHER PUBLICATIONS

Office Action for U.S. Appl. No. 14/941,442, dated Mar. 2, 2018, Cody Peterson, Indicium Illumination, 14 pages.

Office Action for U.S. Appl. No. 15/046,168, dated Aug. 22, 2017, Cody Peterson, Indicium Illumination, 15 pages.

Office Action for U.S. Appl. No. 15/046,168, dated Sep. 11, 2018, Cody Peterson, Indicium Illumination, 14 pages.

PCT Search Report and Written Opinion dated Sep. 7, 2017 for PCT application No. PCT/US2017/035062, 6 pages.

Final Office Action dated Mar. 14, 2019 for U.S. Appl. No. 15/046,168 "Indicium Illumination by Light-Generating Sources" Peterson, 9 pages.

European Search Report dated Dec. 16, 2019 for European Patent Application No. 17807350.8, 8 pages.

Office Action for U.S. Appl. No. 16/678,534, dated Apr. 2, 2020, Peterson, "Indicium Illumination," 8 pages.

The English Translation of the Chinese Office Action dated Aug. 3, 2020 for Chinese Patent Application 201780044453.6, a counterpart of U.S. Appl. No. 16/305,833, 16 pages.

The Chinese Office Action dated Aug. 3, 2020 for Chinese Patent Application No. 201780044453.6, a counterpart of U.S. Appl. No. 16/305,833, 16 pages.

The English Translation of the Chinese Office Action dated Aug. 3, 2020 for Chinese Patent Application No. 201780044453.6, a counterpart of U.S. Appl. No. 16/305,833, 16 pages.

English translation of the Korean Office Action dated Oct. 27, 2020 for Korean Patent Application No. 10-2018-7038188, a counterpart of U.S. Appl. No. 16/305,833, 13 pages.

* cited by examiner

ELECTRONIC DEVICE WITH LIGHT-GENERATING SOURCES TO ILLUMINATE AN INDICIUM

RELATED APPLICATIONS

This application is a continuation of, and claims priority to, U.S. patent application Ser. No. 14/941,442, filed Nov. 13, 2015, entitled "Electronic Device with Light-Generating Sources to Illuminate an Indicium," which claims priority to U.S. Provisional Patent Application 62/080,221, filed Nov. 14, 2014, entitled "Transmissively Illuminated Translucent Indicium on a Mobile Device," the contents of which are incorporated herein in their entireties.

BACKGROUND

Light-emitting diode (LED) technology provides a lighting means that consumes less energy and is more physically robust, smaller, faster-switching, and longer lasting than previous lighting elements. However, the size, functionality, and configuration of conventional LEDs have constrained the use of LEDs to particular applications. As the desirability of thinness of devices has grown, certain functionalities have been sacrificed in order to preserve slim form factors. For example, some laptops include a logo on the laptop lid that is lit while the laptop screen is lit. In most cases, the logo is lit by the backlight for the liquid crystal display (LCD) of the laptop screen and, accordingly, is unlit when the lid is shut or the LCD backlight is otherwise turned off. Continued illumination of the logo when the lid is shut has not previously been contemplated because keeping the backlight lit while the laptop is in a hibernate mode would be an inefficient use of battery and adding extra lighting elements to illuminate the logo would substantially increase the thickness of the laptop. For similar reasons, second displays or other indicia have not been added to laptop covers, mobile devices, or other objects.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques and devices to provide illumination of indicium such as, for example, a logo or user interface disposed on a laptop cover. In some embodiments, the techniques and devices herein provide illumination of indicium without regard to the state of a display of the device. In other examples, the techniques and devices herein provide illumination of indicium when opaque components of the device are located between the lit indicium and a display of the device.

The techniques and systems described herein may be implemented in a number of ways. Example implementations are provided below with reference to the following figures. The implementations, examples, and illustrations described herein may be combined. The term "techniques," for instance, may refer to system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document.

Illustrative Environment

Figure 1A:
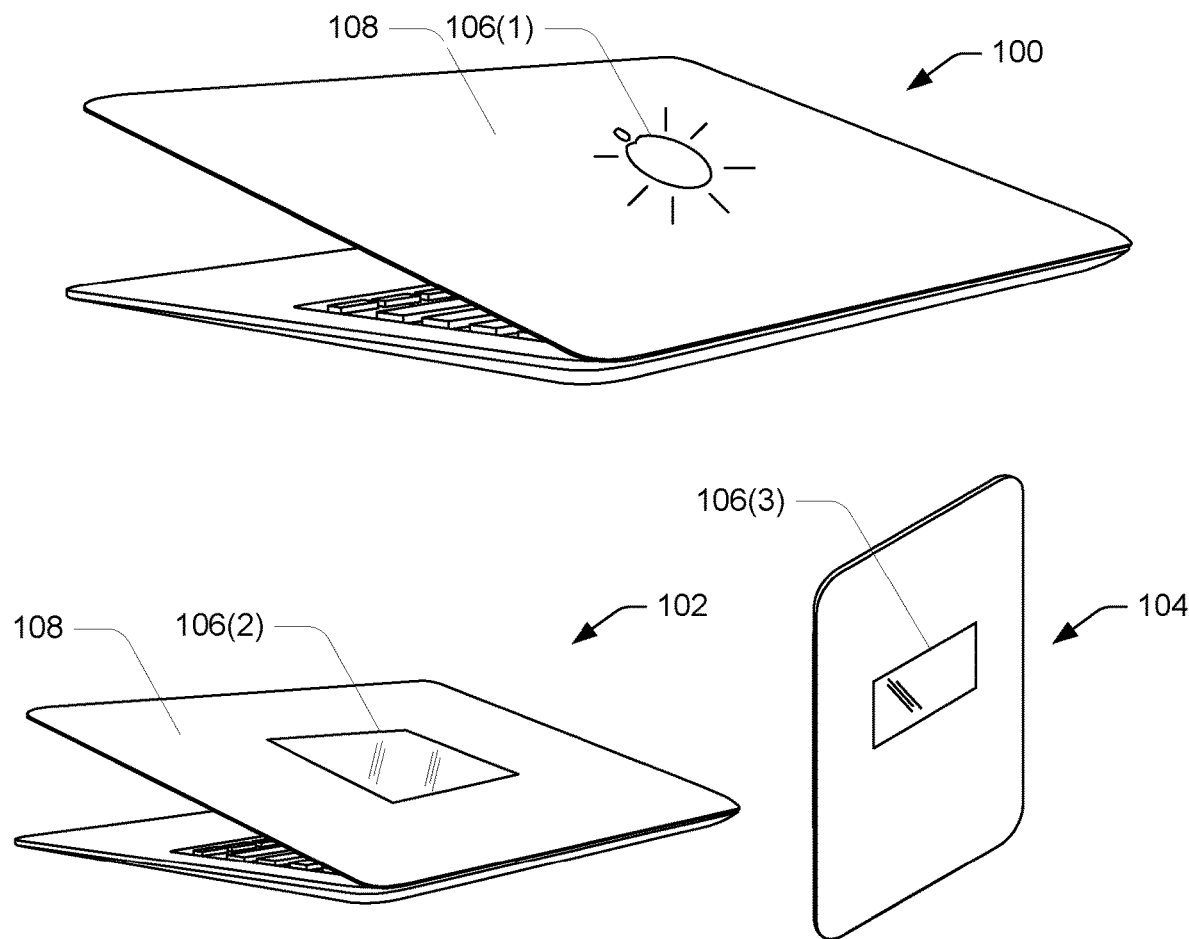
FIG. 1A is an illustration depicting example environments for lighting an indicium located on electronic devices.
Figure 1B:
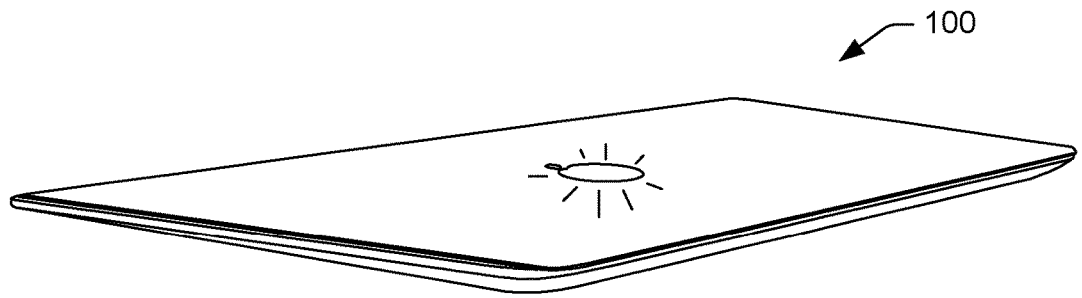
FIG. 1B is an illustration depicting an example environment for lighting an indicium located on a laptop cover.

FIGS. 1A and 1B are illustrations depicting example devices (100, 102, 104) and device states in which examples described herein may operate. In some examples, the various devices may comprise electronic devices such as a laptop 100 or laptop 102. In other examples, the electronic device may be a tablet or smartphone as illustrated at 104. In still other examples, the device may not intrinsically be an electronic device. For example, the device may be any surface to which the lighting elements described herein may be attached or inserted.

In one example, the device comprises a laptop (100, 102) having an indicium (106(1), 106(2)) disposed on the back cover 108 of the laptop. An indicium may include an icon, logo, mark, design, symbol, or display, among others. The indicium may be static (e.g., a translucent plastic inset on a laptop, a sticker on a bike, etching, engraving) or dynamic (e.g., liquid crystal display (LCD)). For example, the indicium may comprise a translucent, semi-transparent, or light-diffusing material shaped as a company mark, such as the indicium 106(1) of laptop 100. In other embodiments, the indicium may be a LCD, such as the indicium 106(2) of laptop 102.

It is not necessary, however, that the device be a laptop (100, 102); the device may be a smartphone or tablet 104 having an indicium 106(3) thereon disposed or any other object having a surface comprising an indicium to which the light-generating sources (LGSs) described herein may be affixed or inserted. For example, the object may be a car or a bike to which a decal is affixed, the LGS being disposed so as to light the decal, whether by affixing the LGS to the decal or by disposing the light generating source underneath or within the decal.

FIGS. 1A and 1B illustrate contrasting device states during which the LGSs described herein may be active. FIG. 1A, at 100 and 102, illustrates a "device open" state where, in the instance of a laptop, the laptop lid is up. During this state, the device is commonly in a "power on" state but may also be in a hibernate or sleep state; a display sleep state, where the display is powered off but the rest of the device or substantially all of the rest of the device remains powered on; or in a "power off" state. These states are also common to electronic devices other than laptops. Often, electronic devices turn off the backlight to the display during power off, hibernate, sleep, and display sleep states to conserve battery power and because having an additional display for continued input/output during these states would increase device thickness and power consumption. The techniques contemplated herein provide the ability to illuminate indicium without increasing device thickness or causing a large drain on the battery.

FIG. 1B illustrates a "device closed" state where, in the instance of a laptop, the laptop lid is shut. During this state, the device is commonly in a "power off" state but may also be in a hibernate or sleep state or a display sleep state, where the display is powered off but the rest of the device or substantially all of the rest of the device remains powered on.

Illustrative Technique for Indicium Illumination Using Thin Edge-Lighting

Figure 2:
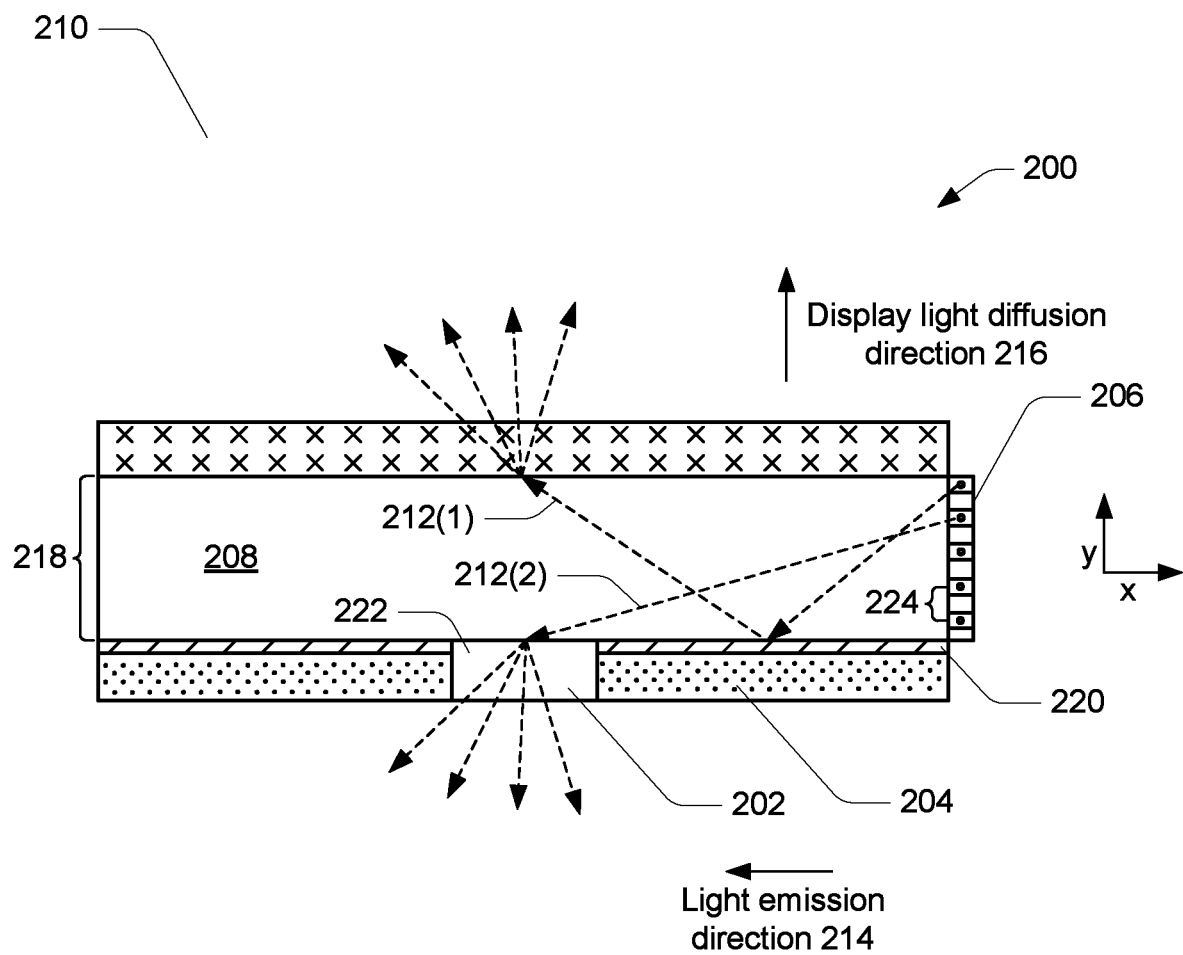
FIG. 2 is a cross-section diagram illustrating a technique for illuminating an indicium using thin edge-lighting.

FIG. 2 depicts a cross-section of an electronic device 200 having an indicium 202 (e.g., a transparent, translucent, or otherwise light-diffusing logo; a liquid crystal display; other display layers, etching, design, symbol, image) disposed in a housing 204 employing a technique for indicium illumination using a thin edge-lighting solution (e.g., LGS 206). The electronic device 200 comprises a light generating source (LGS) 206 along one or more edges (e.g., sides, outside surfaces) of the backlight (e.g., collectively, the LGS 206 and light guide 208). As referred to herein, LGS may refer to an individual lighting element or a group of lighting elements. In some examples, the LGS 206 may be disposed along the entire display (e.g., collectively, the LGS 206, light guide 208, and display layer 210). LGS 206 is disposed along one side and emits light into light guide 208, as illustrated by light rays 212(1) and 212(2). The LGS 206 emits the light in a light emission direction 214 transverse to the display light diffusion direction 216.

Note that a "light diffusion direction" and a "light emission direction" may be the same or different. As used herein, "light diffusion direction" is defined to be the direction in which light generally travels to be perceived by an end user or an intended direction of the device whereas "light emission direction" is defined to mean a direction in which a LGS emits light. It is contemplated that "light diffusion direction" and "light emission direction" may be very broad terms seeing that the actual directions photons travel may vary widely depending on multiple factors, including the material through which they travel (e.g., the medium into which the photon is fired, lenses over the LGS, display layers through which the photons travel). Therefore, the terms refer to the direction that most broadly described the direction in which the particular light is travelling. It is also contemplated that an LGS may emit light in a direction (i.e., light emission direction) that is the same as the light diffusion direction (e.g., when a LGS is oriented to emit light directly at the display layer 210 (see FIG. 7), rather than parallel with the display layer 210 to be refracted into the display layer 210 as illustrated in FIG. 2). Furthermore, just because the language "light emission direction" was chosen to describe the direction in which the LGS is oriented to emit light does not mean that the LGS is not diffused as it is emitted. The term "light emission direction" only defines the original emission direction whereas the light diffusion direction defines a direction in which the light emitted is diffused.

LGS 206 may emit electromagnetic radiation of any wavelength appropriate for the use of the display such as, for example, visible light, ultraviolet, infrared, or x-ray, among others. In other implementations, LGS 206 may be an array of packaged light-emitting diodes (LEDs), organic LEDs (OLEDs), laser diodes, quantum dot LEDs (QD-LEDs), a hybrid of these or any other similar device. In another example, LGS 206 may comprise an array of deposited LEDs (dLEDs) or printable light-emitting diodes (pLEDs). An example of an LGS that is contemplated to be used with the technology described herein is described in U.S. Pat. No. 8,415,879, which is titled "Diode for a Printable Composition," which is incorporated by reference herein. These LEDs are printed, thus they are called pLEDs herein. In one example, the pLEDs may have largely-coplanar electrodes.

For a dLED implementation, individual LGSs (e.g., unpackaged LEDs, LED dies) may be disposed (e.g., printed, laminated, captured) on a substrate (e.g., a thin film having a thickness of less than 0.25 millimeters, a thin film having a thickness of 0.2 millimeters, a thin film having a thickness of 0.1 to 0.15 millimeters, a thin film having a thickness of 0.07 to 0.1 millimeters, a thin film having a thickness of 0.006 to 0.012 millimeters, a flexible thin film). Collectively, dLEDs, pLEDs, LED die, etc. deposited on a substrate are referred to as dLED LGSs herein. Note that in FIG. 2, although discrete units appear to be illustrated as LGS 206, it is contemplated that the LGS may comprise thousands of dLEDs in an embodiment utilizing a dLED LGS.

Unpackaged LEDs may be used as the individual LGSs to form a dLED LGS. In some examples, the unpackaged LEDs have a diameter ranging from 10 to 50 microns and a height ranging from 5 and 20 microns. In one example, the unpackaged LEDs have a maximum width or length, whichever is longer, ranging from about 300 to 320 microns. In some implementations, the individual LGSs (e.g., unpackaged LEDs, LED dies) have a diameter ranging from about 20 to 30 microns and a height ranging from about 5 to 50 microns. In one example, the unpackaged LEDs have dimensions of ranging from 230 to 300 microns on one side, 180 to 200 microns on a second side, and 50 to 80 microns in height. Therefore measurements referencing to thickness with respect to a dLED LGS herein are within 80 microns of the distance stated since the thickness of a dLED LGS is determined primarily by the thickness of the substrate (where thickness of the dLED LGS is a measure of the height of the profile of the dLED LGS or, equivalently, a measure of the distance from the surface of the outermost layer of the substrate to the side of the LGS disposed away from the outermost layer of the substrate).

Furthermore, because the maximum width of unpackaged LEDs is significantly less than that of packaged LEDs, space between the centers of each LED are drastically reduced which therefore increases the uniformity of the perceived light. In one example, the space between the centers of each unpackaged LED after being deposed is 0.05 millimeters. Since LEDs produce a "point" of light and because it is desirable in many applications to have uniform light (i.e., not being able to distinguish each point of light), as a rule of thumb, the diffusing offset distance (i.e., the minimum distance at which the light emitted from a LED array is perceived as uniform) may be approximately equal to the distance between the centers 224 of adjacent LEDs. Therefore, for a dLED LGS, the diffusing offset distance may have a diffusing offset distance of approximately 0.05 millimeters.

Any suitable type of technology can be utilized to implement conductive traces. Examples of suitable technologies include, by way of example and not limitation: silver, carbon-like material, or any other material for conducting electricity. The conductive traces may be composed of material that is reflective, opaque, or otherwise not translucent nor transparent. In some examples, the conductive traces may be translucent or transparent (e.g., by using indium tin oxide). The conductive traces may include conductive nano-fibers. Conductive traces may be created using conventional conductive ink or other similar processes. Conductive inks may be classed as fired high solids systems or PTF (polymer thick film) systems that allow circuits to be drawn or printed on a variety of substrate materials such as polyester to paper. These types of materials usually contain conductive materials such as powdered or flaked silver and carbon like materials. While conductive inks can be an economical way to lay down a modern conductive traces, traditional industrial standards such as etching of conductive traces may be used on relevant substrates. In yet another example, conductive traces may be premade similarly to photo-etched copper and can have a secondary conductive bond material (e.g., solder) applied to the premade conductive trace to facilitate attachment.

Conventional light guides for edge-lit applications employing packaged LEDs have a thickness 218 of approximately 0.25-0.5 millimeters. In an example employing dLED LGSs, the light guide 208 need not be that thick. In an implementation employing dLED LGSs to edge-light the display (collectively, the LGS 206, light guide 208, and display layer 210), the dLED LGS may be directly attached to the edge of the light guide 208 (e.g., molded, pressed, adhered) without a lens structure common to packaged LEDs. Furthermore, the light guide 208 need not be as thick as conventional light guides (0.25-0.5 millimeters) since dLEDs have a substantially smaller dimensions and may sufficiently illuminate the light guide 208 and display layer 210.

Laptops and other displays, such as televisions, commonly employ edge-lighting to illuminate the liquid crystal displays (LCDs) that convey images to users. Display layer 210 represents the various layers of a LCD (e.g., polarizing film, glass filter, negative electrode, liquid crystal layer, thin film transistors, positive electrode, cover glass), diffuser, prism film, and any additional or any other appropriate layers that would modify light to represent images (e.g., images, symbols, signals). Light rays 212(1) that reflect are refracted in the display light diffusion direction 216 are modified (e.g., diffused, blocked, colored) by the display layer 210, to form the desired image (e.g., image, symbol, signal).

In some instances, to increase the brightness of the images presented to the user via the display layer 210, a reflector 220 (e.g., mirror) may be included between the light guide 208 and the housing 204. In one example, the reflector 220 may be non-continuous to illuminate an indicium 202 disposed in the housing 204. A gap 222 in the reflector 220 allows light to pass through to illuminate the indicium 202, which may be incorporated in the housing 204 and permit at least some of light rays 212(2) to pass therethrough.

Illustrative Technique for Indicium Illumination Using Thin Second Display

Figure 3A:
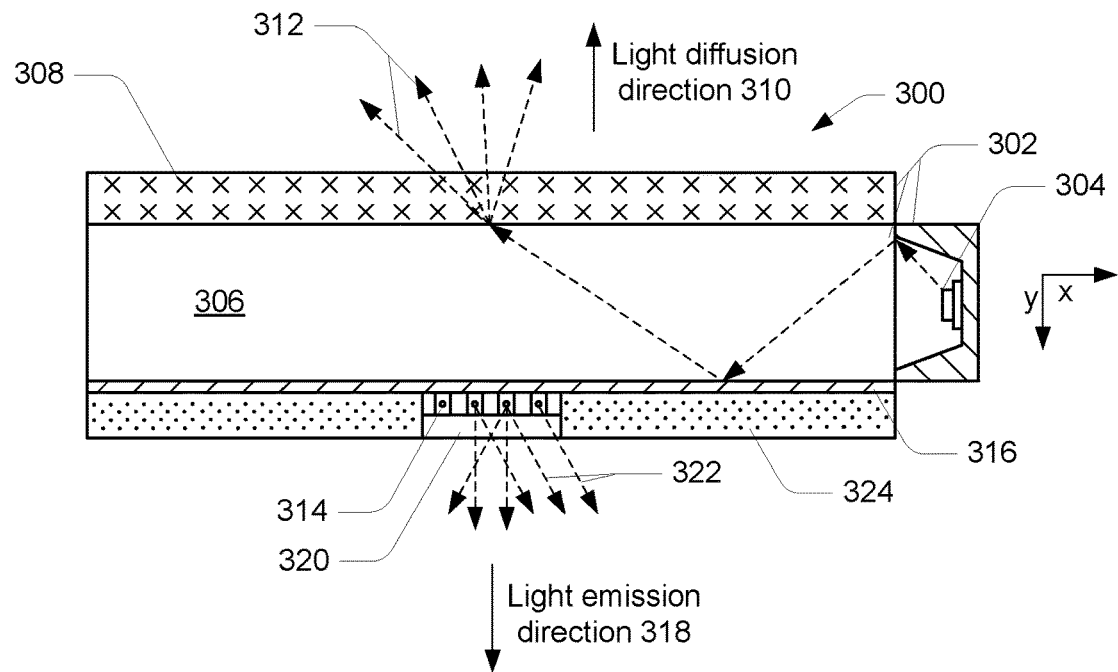
FIG. 3A is a cross-section diagram illustrating a technique for illuminating an indicium using a thin second display.

FIG. 3A depicts a cross-section of device 300 comprising a first display 302 (e.g., light-emitting diode (LED)-backlit liquid crystal display (LCD)) comprised of an LED 304, light guide 306, and display layer 308 (having the same or similar components as display layer 210 above if a LCD is used) and having a light diffusion direction 310 in which general direction the light rays 312 are refracted after being emitted by the LED 304 and modified (e.g., diffused, colored, blocked, intensified) by the display layer 308 propagate.

Figure 3B:
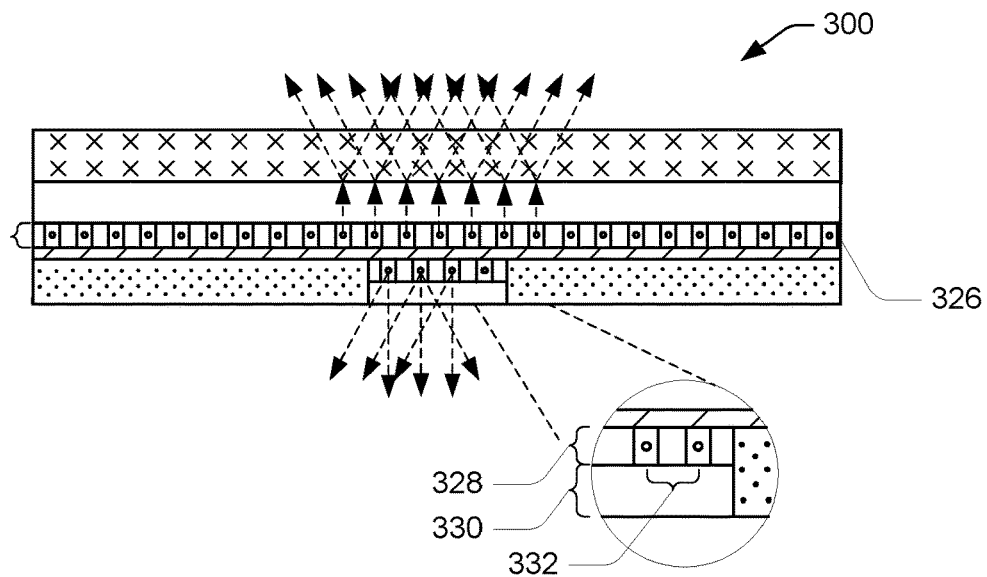
FIG. 3B is a cross-section diagram illustrating another technique for illuminating an indicium using a thin second display.

Although the description and illustration of FIG. 3A depicts a device 300 employing a LED-backlit LCD, other display means can alternatively be employed as a first display 302, such as, for example, full array LED backlighting (e.g., LEDs emitting light directly in the light diffusion direction 310 rather than transversely and being disposed on the reflector 310 throughout the x-z coordinate plane), dynamic backlight (e.g., "local dimming" wherein backlighting LEDs are controlled individually or in clusters to control the level of light/color intensity in a given part of the screen), organic LED, plasma, cathode ray tube, or a thin display (e.g., dLED LGSs) as illustrated in FIG. 3B, among others. Any suitable display device may be employed as a first display 302 having a first light diffusion direction 310 to which the thin second display 314 may be affixed.

In one example, the thin second display 314 may comprise LGSs affixed to a substrate (e.g., collectively, dLED LGSs) and may be affixed (e.g., molded, laminated, pressed, adhered) to a reflector 316. The thin second display 314 has a second light emission direction 318 that illuminates indicium 320 through which light rays 322 pass or may be blocked if indicium 320 is a LCD. The indicium 320 may therefore be illuminated independently of a state of the display 302. That is, the indicium 320 may be illuminated by the thin second display 314 whether or not the LED 306 is active to provide backlight for the display layer 308.

In yet another example, the thin second display 314 (e.g., a dLED LGS) may be affixed to the light guide 306. In that example, the substrate to which the LGSs are deposited may have a reflective surface on the side affixed to the light guide 306. Alternatively, the substrate could be translucent or transparent to allow light from the thin second display 314 to radiate in the light diffusion direction 310 to illuminate the display layer 308. For example, the first LED 304 providing backlight for the display 302 may be inactive and the thin second display 314 may be active to light one or more of the indicium 320 and the display layer 308. This may provide a lower power option for displaying user interfaces that may not require as many pixels of a display. Examples of such user interfaces may include, for example, a login box, notification, or status.

In some instances, the thin second display 314 can be affixed to a housing 324 or to the indicium 320 itself. In one example, the thin second display 314 is affixed to the housing 324 of an electronic device having other layers disposed between the housing 324 and a first display (e.g., a thin second display affixed to the housing of a smartphone where a battery and other components separate the housing on the one side from the first display on the other side). Furthermore, the thin second display 314 may simultaneously contact or be affixed to one or more of the light guide 306, the reflector 316, housing 324, and the indicium 320. In one example, the thin second display 314 may be affixed to one of the light guide 306, the reflector 316, or the housing 324 and there may be space in between the thin second display 314 and the indicium 320. Alternatively, diffusion, prism, phosphor, additional dLED, or other layers may be disposed between the thin second display 314 and the indicium 320. For example, in an example where the thin second display 314 comprises a dLED LGS, to provide modifications to the coloration of the light rays 322, a phosphor layer may be applied to individual LGSs (e.g., LED die) before depositing individual LGSs on the substrate or a phosphor layer may be applied to the LGS and substrate post-deposition.

In yet another example, the thin second display 314 may comprise a flexible substrate (e.g., a polyester substrate) which can be shaped so as to form the outline of a symbol, image, or logo, thereby illuminating the outline or the entirety of the symbol, image, or logo. It is also contemplated that the indicium 320 may be on the same side of a device as the display 302 (e.g., a logo underneath a monitor screen) or may have multiple indicia 320, whether on a same side of a device or on opposing sides (e.g., a smartphone having a display with a logo above the display and a logo on an opposite side, a device having multiple screens).

FIG. 3B similarly illustrates a cross-section of device 300 in a different configuration according to alternate examples discussed above. For example, FIG. 3B illustrates use of a different type of first display, namely a thin display 326 (e.g., dLED LGS) of the same or similar type as the thin second display 314 (e.g., dLED LGS). The examples discussed with regard to the functionality and uses of a thin second display are equally applicable here. Using a thin display 326 may increase thinness of the total display due to the eliminated need for a light guide and the decrease in diffusing offset distance.

FIG. 3B also illustrates a cross-section of a thin display 326 having thickness 328 (i.e., for a dLED LGS this equals a total height of the profile of the substrate and the LEDs) of less than 0.25 millimeters, although the thickness may be within a range of 0.1 to 0.15 millimeters, 0.025 to 0.1 millimeters and as little as 0.015 millimeters. Furthermore, FIG. 3B illustrates a minimum diffusing offset distance 330 (i.e., the distance from an emission surface of the thin display 326 to the viewing surface which is in this case a surface of the indicium 320), which is equal to the distance between the centers of the light emitting components of the thin display 326 as illustrated by 332 (i.e., the distance 330 is equal to the distance of 332).

Figure 4A:
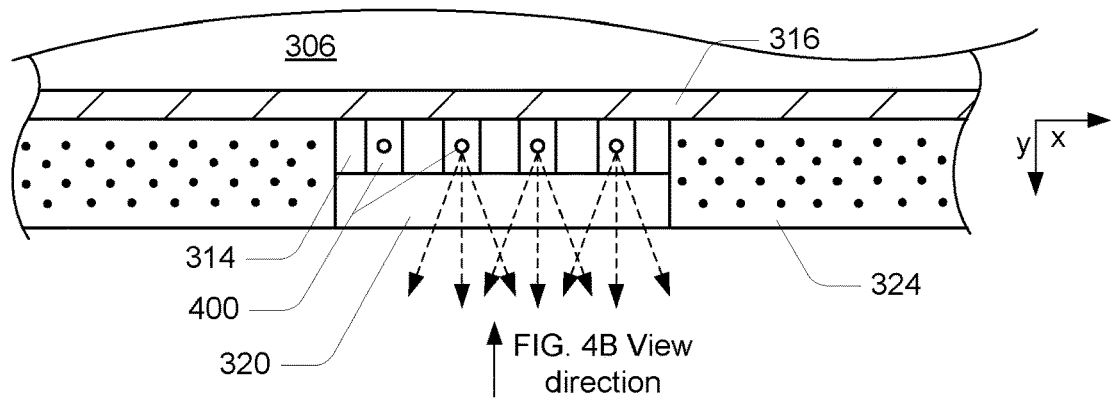
FIG. 4A is a cross-section diagram illustrating an example disposition of a thin second display to illuminate an indicium.

FIG. 4A illustrates a close up cross-section of the thin second display 314 (e.g., dLED LGS) in one example configuration to illuminate the indicium 320. In this example, the thin second display 314 is affixed to one or more of the light guide 306, reflector 316, or housing 324 such that the LGSs 400 emit light away from or, equivalently, perpendicular to the largest surface area of one or more of the light guide 306, reflector 316, or housing 324. The thin second display 314 emits in a positive y-direction as defined by the Cartesian coordinates in FIG. 4A. This embodiment is similar to "full-array" or direct LED lighting embodiments.

Figure 4B:
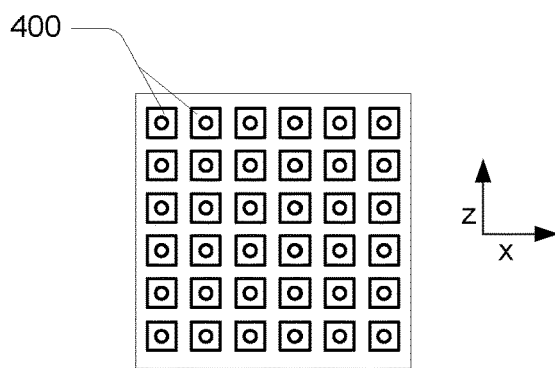
FIG. 4B is a diagram looking towards an emission direction of the described light-generating sources illustrating an example disposition of a thin second display to illuminate an indicium.

FIG. 4B is a diagram illustrating an example layout of LGSs 400 looking towards the emission of the LGSs 400 or, equivalently, in a negative y-direction as defined by the Cartesian coordinates in FIG. 4A. In some examples, the LGSs 400 or LGS groups may be evenly dispersed throughout the thin second display 314. Any other appropriate pattern or distribution of the LGSs 400 that would appropriately light the indicium 320 for the particular use is contemplated. FIG. 4B illustrates that the LGSs 400 may be disposed such that the LGSs 400 emit light towards the indicium 320 or, equivalently, in a positive y-direction.

Figure 4C:
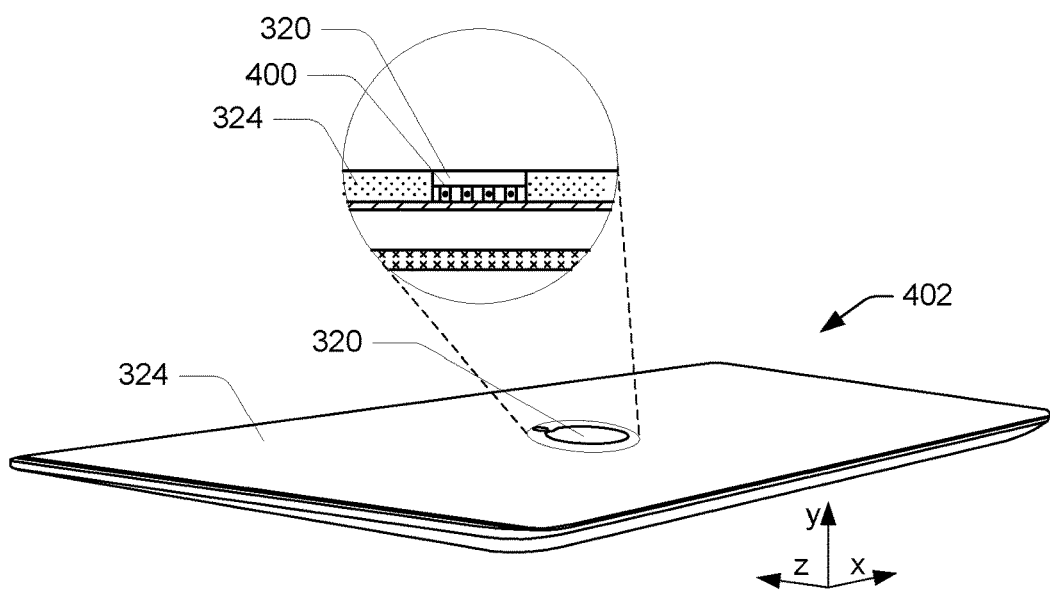
FIG. 4C is an example environment of the described technique employing a thin second display to illuminate the indicium and includes a cross-section diagram illustrating an example disposition of a thin second display to illuminate an indicium.

FIG. 4C further illustrates an example environment in which the configuration of the thin second display illustrated by FIG. 4A and discussed above may be employed. FIG. 4C depicts a laptop 402 and a cross-section of laptop 402 having an indicium 320 disposed in a housing 324 being lit by LGSs 400. Note that the cross-section is inverted compared to the cross-section of FIG. 4A to correspond with the depicted orientation of the laptop 402.

Figure 5A:
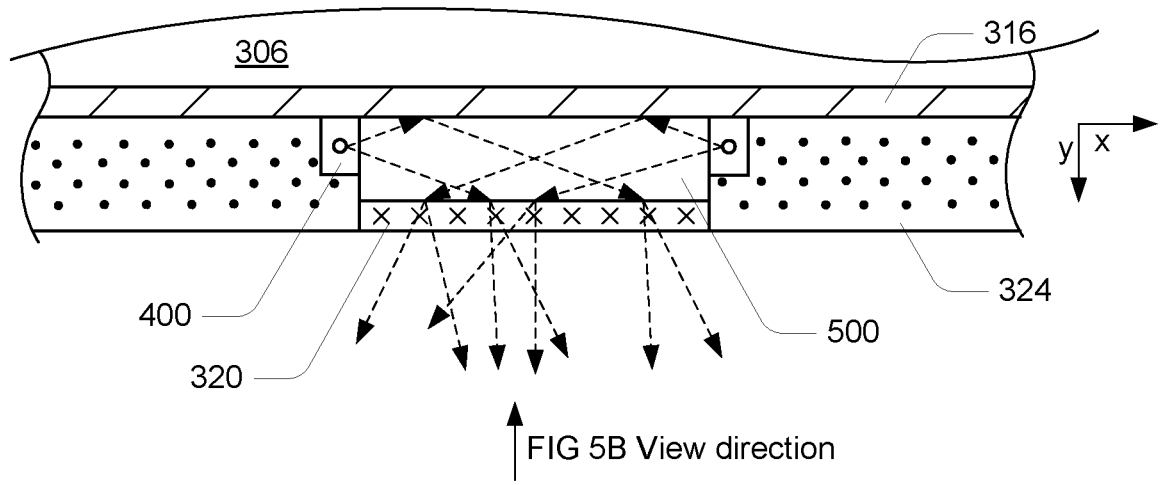
FIG. 5A is a cross-section diagram illustrating an example disposition of a thin second display to illuminate an indicium.

FIG. 5A illustrates a close up cross-section of the thin second display 314 (e.g., thousands of individual LGSs arranged in an array or matrix, each portion of the array or matrix being addressable and the array or matrix composing pixels of a display or being positioned under respective pixels of a display) in one example configuration. In an example, rather than or additionally to disposing the LGSs 400 such that they emit light towards the indicium 320, the LGSs 400 may be arranged so that one or more LGSs are disposed to emit light parallel to the indicium 320 in an "edge-lit"-type application. One or more LGSs 400 may be disposed along one or more sides of a cavity 500 or along a continuous portion less than an entirety of the indicium and illuminate towards an interior portion of the indicium. The cavity 500 may comprise empty space, gas or liquid, the indicium 320 (e.g., translucent or semi-transparent material, LCD, other display layers, etching), or other layers to modify the light, such as a phosphor layer or other LGSs. The indicium 320 is lit by light refracted in the cavity 500, therefore it may be helpful to include a light guide or a light guide and a prism layer. Note that FIG. 5A depicts indicium 320 as a diffusive material that does not occupy the totality of the cavity 500. The indicium may fill the entire cavity 500 or may be disposed on the outside of the housing 324. Furthermore, the indicium may comprise any material, LCD, or etching, among other things.

Figure 5B:
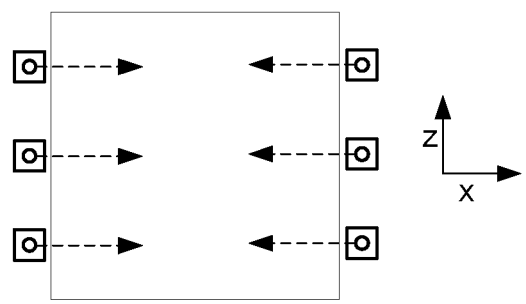
FIG. 5B is a diagram of the example disposition of the thin second display of FIG. 5A from another angle.

FIG. 5B depicts an example configuration of the LGSs 400 in an "edge-lit" application of the thin second display 314 to light the indicium 320. As is discussed above, the LGSs 400 may be disposed so as to illuminate an interior of the cavity 500 or, in some cases equivalently, an interior of the indicium 320. In some examples, LGSs 400 may be disposed on less than an entire side of the cavity 500 or indicium 320. In other examples, the LGSs 400 are disposed on one or more sides of the cavity 500 or indicium 320. In one example, the LGSs 400 are disposed around a circumference of the cavity 500 or indicium 320 and illuminate towards an interior portion of the cavity 500 or indicium 320. In another example, the LGSs 400 are disposed along a portion less than an entirety of the indicium and illuminate towards an interior portion of the indicium. In this example configuration, the LGSs may occupy space in the housing 324 as illustrated.

Figure 6A:
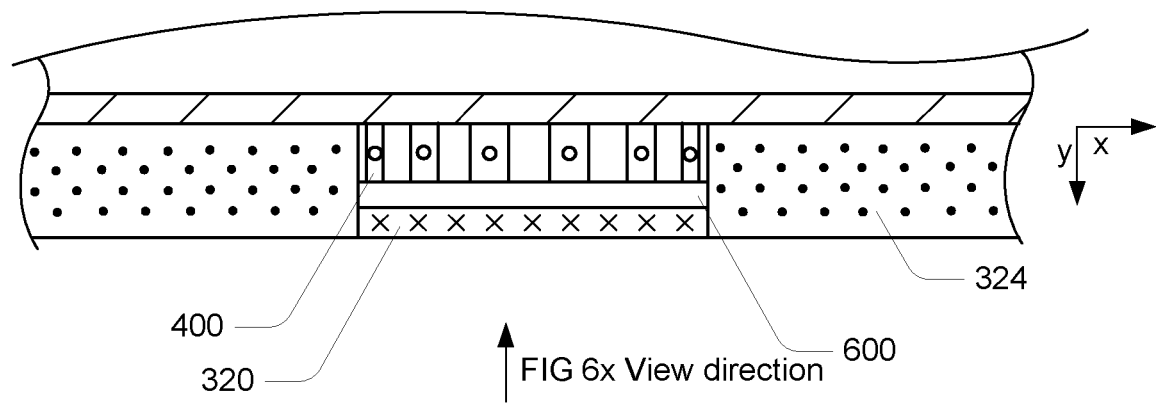
FIG. 6A is a cross-section diagram illustrating an example disposition of a thin second display to illuminate an indicium.

FIG. 6A depicts yet another cross-section of an example configuration of the thin second display 314 to illuminate the indicium 320. In this example, the LGSs 400 are disposed along the outside of a cavity 600 such that the LGSs 400 emit light towards an interior of the cavity 600 or the indicium 320, depending on the implementation. In this example, the substrate to which the LGSs 400 are affixed may be flexible, allowing the substrate with the LGSs deposed thereon to be disposed over the surface of any object. In order to accomplish this, the substrate may further comprise an adhesive layer (not shown). The substrate may be attached to the housing 324 via adhesion, vulcanization, pressing, molding, or any similarly contemplated method. In another example, the LGSs 400 may be formed into the indicium itself or disposed throughout the indicium 320 via injection molding, printing, or a similarly contemplated method. It is also contemplated that the LGSs 400 need not be disposed along all sides of the cavity 600 or indicium 320 or to continuously be disposed.

Figure 6B:
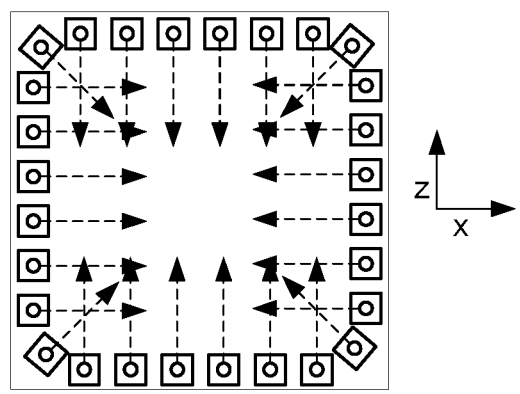
FIG. 6B is a diagram of the example disposition of the thin second display of FIG. 6A from another angle.

FIG. 6B depicts an example configuration and orientation of the LGSs 400. As is discussed above, the LGSs 400 may be disposed so as to illuminate an interior of the cavity 600 or, in some cases equivalently, an interior of the indicium 320. In some examples, LGSs 400 may be disposed on less than an entire side of the cavity 500 or indicium 320. In other examples, the LGSs 400 are disposed on one or more side of the cavity 500 or indicium 320. In one example, the LGSs 400 are disposed around a circumference of the cavity 500 or indicium 320 and illuminate towards an interior portion of the cavity 500 or indicium 320.

Illustrative Technique for Indicium Illumination Using One Thin Display

Figure 7:
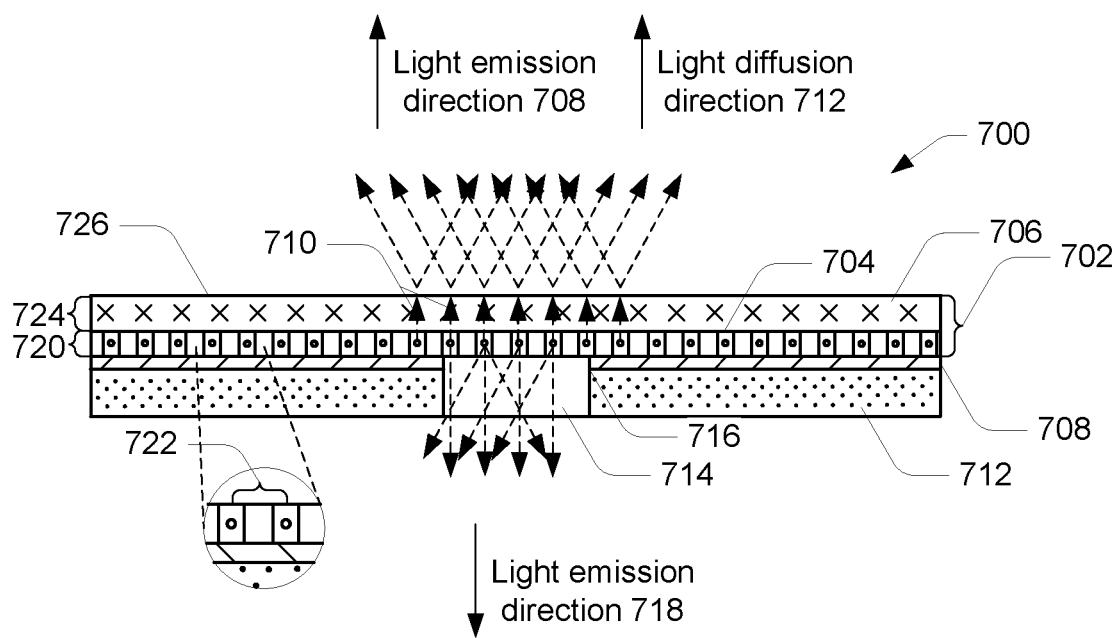
FIG. 7 a cross-section diagram illustrating a technique for illuminating a display and an indicium using a thin display.

FIG. 7 depicts a cross-section of device 700 comprising a thin display 702 (e.g., light-emitting diode (LED)-backlit liquid crystal display (LCD), dLED LGS-backlight LCD, dLED LGS) comprised of a backlight 704 (e.g., dLED LGS) and display layer 706 (e.g., LCD) and having a light emission direction 708 in which general direction the light rays 710 are emitted by the backlight 704 and modified (e.g., diffused, colored, blocked, intensified) by the display layer 308 in light diffusion direction 712. Although FIG. 7 depicts a thin display 702 having a backlight 704 and a display 706 (e.g., LCD) it is contemplated that the backlight 704 may comprise addressable LGSs (i.e., each LGS or groups of LGSs may be individually controllable) and adequately colored (e.g., by employing phosphor layer over the backlight 704 or by coating the unpackaged LED dies in a phosphor layer before depositing them on a substrate) so that the display layer 706 is unnecessary and may either be replaced or completely removed. In one example, the display layer 706 may be replaced with one or more of a prism layer, a diffusion layer, a diffusing distance offset layer, another LGS layer, a phosphor layer, or any other similarly contemplated layer or surface.

In one example, the thin display 702 may be affixed to a reflector 708. In other examples, the thin display 702 may be affixed to one or more of a housing 712, an indicium 714, or the display layer 706. In some examples the reflector 708 is non-continuous, providing for a cavity 716 that allows light emitted by the thin display 314 to illuminate the indicium 714. The cavity 716 may comprise empty space, gas or liquid, the indicium 714, or other layers to modify the light such as a phosphor layer or other LGS. In this example the indicium 714 is lit by light emitted into the cavity 716 from the backlight 704, therefore it may be helpful to include a light guide or a light guide and a prism layer. The indicium 714 may fill the entire cavity 716, part of the cavity 716, or may be disposed on the outside of the housing 712. Furthermore, the indicium may comprise any material, LCD, or etching, among other things.

In order to illuminate the indicium 714, a substrate of the backlight 704 may be translucent or transparent to allow light to radiate toward the indicium 714 in a light emission direction 718.

In one example that employs a dLED LGS to compose the thin display 702, a uniformly-lit and thin display is achievable while illuminating the indicium 714. The thin display 702 is thinner than conventional displays because the backlight 704 comprising dLED LGS has a thickness 720 of less than 0.25 millimeters and, in some examples, a thickness 720 of at most 0.2 millimeters. In yet other examples, the backlight 704 has a thickness 720 of between 0.1 and 0.15 millimeters. In one example, the backlight 704 has a thickness 720 of between 0.025 and 0.1 millimeters. Furthermore, the distance between adjacent LED edges 722 in a backlight 704 comprising a dLED LGS is 0.05 to 0.1 millimeters or less, meaning the diffusing offset distance only has to be 0.05 millimeters. For this reason, a distance 724 from an emission side of the backlight 704 to a viewing surface 726 need only equal the diffusing offset distance (e.g., 0.05 millimeters).

Furthermore, the backlight 704 may comprise a dLED LGS that has individually addressable (e.g., controllable) dLEDS or group-addressable dLEDs. The dLEDs may also emit light of different wavelengths. Individually controlling the intensity of light emitted by individual dLEDs or groups of dLEDs emitting light of the same wavelength while controlling the intensity of light emitted by other individual dLEDs or groups of dLEDs emitting light of another wavelength may permit the backlight 704 to display images without the need for a LCD (e.g., individual dLEDs or groups of dLEDs that emit red, green, and blue light which, when each is varied in intensity and mixed, emits a spectrum of visible light). Therefore, the thickness of the display layer 706 may be drastically reduced or eliminated since electrode and liquid crystal layers may be removed.

Illustrative Technique for Indicium Illumination on a Surface

Figure 8A:
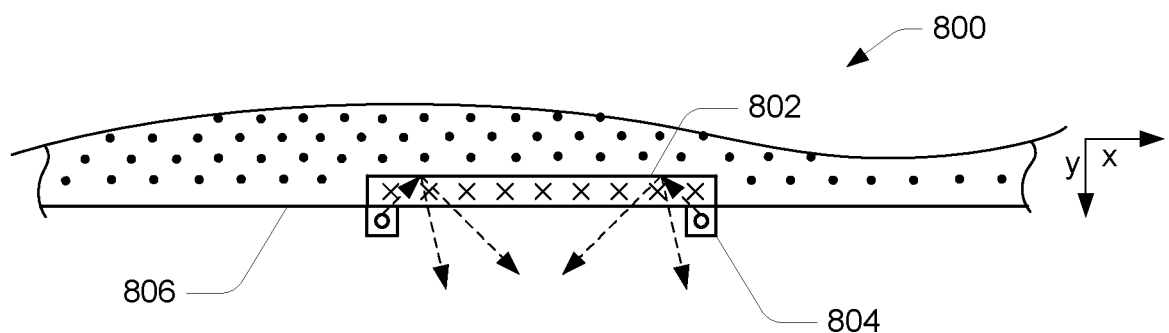
FIG. 8A is a cross-section diagram of an example of an indicium illuminated by a surface-mounted light-generating source.
Figure 8B:
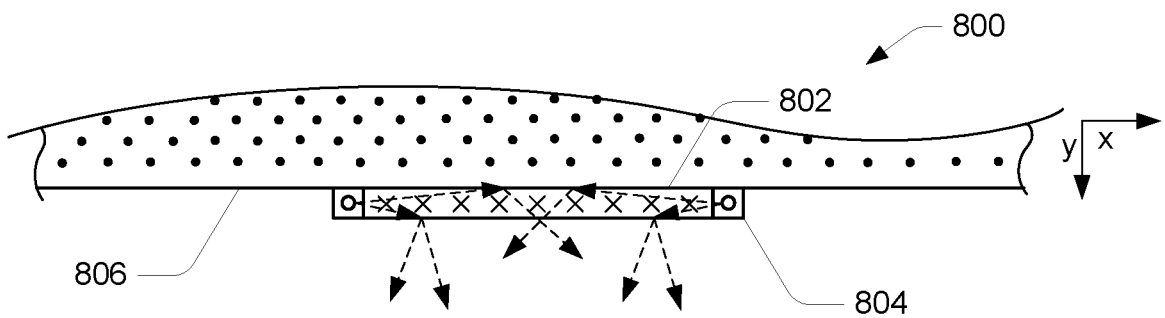
FIG. 8B is a cross-section diagram of an example of an indicium illuminated by a surface-mounted light-generating source.

FIGS. 8A and 8B depict cross-sections of an object 800 having an indicium 802 therein or thereon disposed and being illuminated by surface-mounted LGS 804. The object 800 may be any object having a surface to which the surface-mounted LGS 804 may be affixed. Indicium 802, as discussed before, may be a transparent or translucent logo (e.g., plastic icon), etching, LCD, or a design (e.g., a sticker, printed shape), among other things. In some examples, the surface-mounted LGS 804 may be affixed to a surface 806 of the object 800 by adhesion, vulcanization, pressing, molding, or any similarly contemplated method. In another example, the surface-mounted LGS 804 may be formed into the indicium 802.

In one example, as illustrated by FIG. 8A, the indicium 804 is disposed within the surface of the object 800 and the surface-mounted LGS 804 may be disposed over at least part of the indicium 804. In another example, fiber optics or a light guide may be employed so that the surface-mounted LGS 804 is not itself disposed over the indicium 802, but light from the surface-mounted LGS 804 reaches the indicium 802.

In some examples similar to that illustrated in FIG. 8B, the surface-mounted LGS 804 may comprise dLEDs and a flexible substrate having an adhesive disposed thereon on a side opposite the dLEDs. In this example, the surface-mounted LGS 804 may be adhered to the object 800. For example, the surface-mounted LGS 804 could be manufactured like a sticker that has an additional layer to protect the adhesive layer that can be removed. The sticker may be shaped as a company trademark, and the edges of the trademark or the entire trademark may be illuminated by dLEDs disposed on the surface or edges of the flexible substrate. It is contemplated that in FIG. 8B, the indicium 802 may have a thickness equal to or different than the surface-mounted LGS 804 and may diffuse, refract, or reflect the light emitted by the surface-mounted LGS 804.

Illustrative Techniques for Control of Indicium Illumination and Notifications

Figure 9:
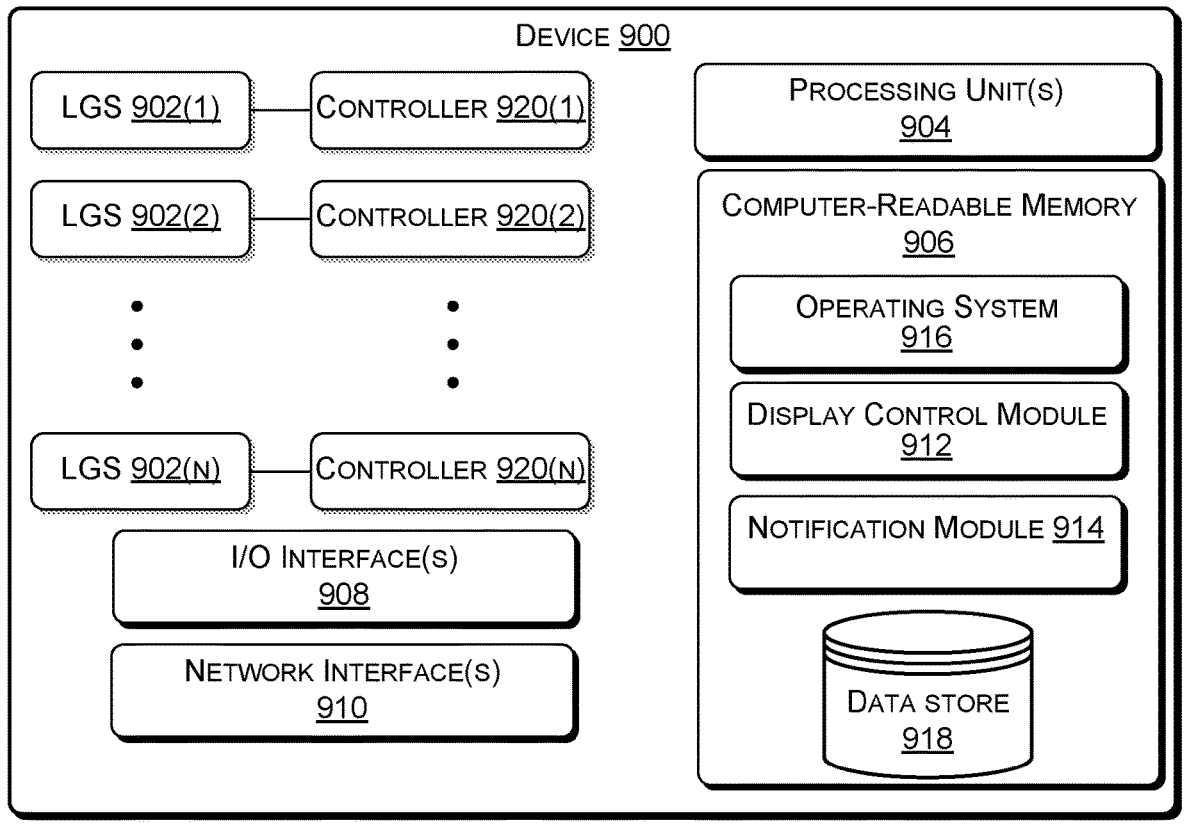
FIG. 9 is a block diagram illustrating an example device employing the described techniques.

FIG. 9 depicts a block diagram of an example electronic device 900 that controls illumination of an indicium by LGS array (902(1)-902(n)). Example electronic device 900 may include any type of computing device having one or more processing unit(s) 904 operably connected to computer-readable media 906. The connection may be via a bus, which in some instances may include one or more of a system bus, a data bus, an address bus, a PCI bus, a Mini-PCI bus, and any variety of local, peripheral, and/or independent buses, or via another operable connection. Processing unit(s) 904 may represent, for example, a CPU incorporated in example electronic device 900.

Example electronic device 900 may include any type of computing device having one or more processing unit(s) 904 operably connected to computer-readable media 906, I/O interfaces(s) 908, and network interface(s) 910. Computer-readable media 906 may have a display control module 912 and a notification module 914 stored thereon.

The computer-readable media 906 may include, at least, two types of computer-readable media, namely computer storage media and communication media. Computer storage media may include volatile and non-volatile, non-transitory machine-readable, removable, and non-removable media implemented in any method or technology for storage of information (in compressed or uncompressed form), such as computer (or other electronic device) readable instructions, data structures, program modules, or other data to perform processes or methods described herein. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions.

In contrast, communication media may embody computer-readable instructions, data structures, program modules, or other data in a modulated data signal, such as a carrier wave, or other transmission mechanism. As defined herein, computer storage media does not include communication media.

Example electronic device 900 may include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s), such as CPU-type processors (e.g., micro-processors), GPUs, or accelerator device(s).

In some examples, as shown regarding example electronic device 900, computer-readable media 906 may store instructions executable by the processing unit(s) 904, which may represent a CPU incorporated in example electronic device 900. Computer-readable media 906 may also store instructions executable by an external CPU-type processor, executable by a GPU, and/or executable by an accelerator, such as an FPGA type accelerator, a DSP type accelerator, or any internal or external accelerator.

Executable instructions stored on computer-readable media 906 may include, for example, an operating system 916, a display control module 912, a notification module 914 and other modules, programs, or applications that may be loadable and executable by processing units(s) 904. Alternatively, or in addition, the functionally described herein may be performed, at least in part, by one or more hardware logic components such as accelerators. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator may be a hybrid device, such as one from ZYLEX or ALTERA that includes a CPU core embedded in an FPGA fabric.

In the illustrated example, computer-readable media 906 also includes a data store 918. In some examples, data store 918 includes data storage such as a database, data warehouse, or other type of structured or unstructured data storage. In some examples, data store 918 includes a relational database with one or more tables, indices, stored procedures, and so forth to enable data access. Data store 918 may store data for the operations of processes, applications, components, and/or modules stored in computer-readable media 906 and/or executed by processing unit(s) 904 or accelerator(s). For example, data store 918 may store version data, iteration data, clock data, and other state data stored and accessible by the display control module 912 and the notification module 914.

Example electronic device 900 may further include one or more input/output (I/O) interface(s) 908 to allow example electronic device 900 to communicate with input/output devices such as user input devices including peripheral input devices (e.g., a keyboard, a mouse, a pen, a game controller, a voice input device, a touch input device, a gestural input device, indicium, and the like) and/or output devices including peripheral output devices (e.g., a display, a printer, audio speakers, a haptic output, indicium, and the like). Example electronic device 900 may also include one or more network interface(s) 910 to enable communications between example electronic device 900 and other networked devices. Such network interface(s) 910 may include one or more network interface controllers (NICs) or other types of transceiver devices to send and receive communications over a network.

Example electronic device 900 may further include controller(s) 920(1)-920(n). In one example, controller(s) 920(1)-920(n) may comprise PN junction diodes, PIN diodes, FETs, electrodes, and/or other appropriate semiconductors or circuits to transition current supplied to the LGS(s) 902(1)-902(n) between a grounded state and fully powered state. The controller(s) 920(1)-920(n) thereby a means for the display control module 912, which may be implemented as software stored on the computer-readable memory 906, to increase or decrease the amplitude of the light emitted by the LGS(s) 901(1)-902(n). In one example where the LGS(s) 902(1)-902(n) emit light of different wavelengths, the display control module 912 is able to coordinate by the controller(s) 920(1)-920(n) the amplitude of the light emitted at various wavelengths, thereby controlling a total color of various regions illuminated by the LGS(s) 902(1)-902(n), such as regions of an indicium. Although FIG. 9 depicts LGS(s) 901(1)-902(n) and controller(s) 920(1)-920(n) as being part of example electronic device 900, it is contemplated that the LGS(s) 901(1)-902(n) and controller(s) 920(1)-920(n) may not be a part of device 900 but may be communicatively coupled with example electronic device 900 by I/O interface(s) 908 or network interface(s) 910.

In some examples the display control module 912 and the notification module 914 are at least partially implemented in software. Display control module 912 is configured to control states of the LGS(s) 902(1)-902(n) by the controller(s) 920(1)-920(2). For example, display control module 912 may comprise software instructions stored on computer-readable memory 906 configured to execute on the processing unit(s) 904 to configure the controller(s) 920(1)-920(2) to increase and decrease current supplied to the LGS(s) 902(1)-902(n). Where I/O interface(s) 908 include communicative coupling with other displays, display control module 912 may also control states of such displays.

The notification module 914 may receive notifications from other devices (e.g., servers, user devices) connected to example electronic device 900 via network interface(s) 910, the operating system 916, I/O interface(s) 908, applications stored in the data store 918, or other inputs. Notifications, as used herein, may comprise messages (e.g., emails, SMS, MMS, calls, video chat, or indications that one or more of these have been received), register states (e.g., flag states), device states (e.g., hibernate, sleep, power on, power off, battery level, network connectedness, device alerts), geo-data (e.g., location, speed, acceleration), application inputs/outputs (event reminders, social media notifications, application readiness state, time remaining in a process, time of day, date, security alerts, call received, music play state, music information), among other indications of states, inputs, and outputs of an electronic device. It is further contemplated that the object to which the LGS(s) 902(1)-902(n) are affixed is not electronic, in which case the notifications may comprise indications of information about the state of the object or inputs to the object (e.g., speed of the object, force applied to the object or a portion of the object).

The notification module 914 in coordination with the display control module 912 may illuminate the LGSs 902(1)-902(n) to cause a representation of a notification to appear on the indicium (e.g., an envelope symbol to represent an email received, a green color to signify a received call, pulsing light to signify a sleep mode, a scrolling animation to represent a process in progress, a flashing red color to signify a security alert). The display control module 912, by the controller(s) 920(1)-920(n), controls the color and intensity of the LGS(s) 902(1)-902(n) such that a the indicium is lit with a symbol, image, animation. In an application where the indicium is a LCD, the display control module 912 may configure the controller(s) 920(1)-920(n) to provide the appropriate light as a backlight for the liquid crystals and electrodes of the LCD, which control the color and intensity of the light emitted from the display.

Figure 10:
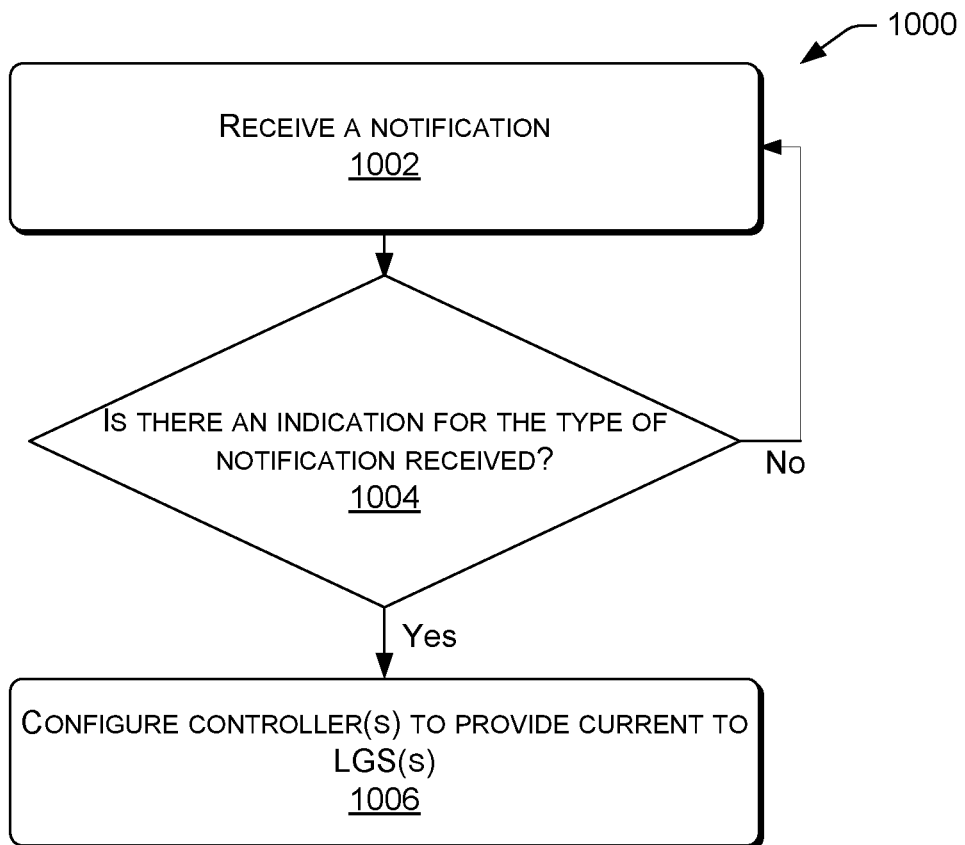
FIG. 10 is a flow chart of an example method to effect notifications on an indicium.

FIG. 10 is a flowchart illustrating an example method 1000 of illuminating an indicium to represent a notification. At step 1002, the notification module 914 receives a notification from another device via network interface(s) 910, the operating system 916, I/O interface(s) 908, applications stored in the data store 918, or other inputs. The notification module 914 may employ a push or pull model. In a push model, the notification module 914 is pushed notifications from the source (e.g., a server, another device, the operating system) of the notification without requesting the notification. In a pull model, the notification model 914 periodically queries the sources of notifications to ascertain whether there are new notifications.

Once a notification is obtained, at step 1004, the notification module 914 may check the data store 918 to ascertain whether there is an indication for the type of the notification received (e.g., an envelope icon for an email received notification, a flashing green animation for an incoming call, symbols corresponding to the time of day and date). If there isn't an appropriate indication for the type of notification received (e.g., no symbol, image, animation, coloration, etc. has been corresponded with the notification type), the notification module 914 returns to awaiting a notification or querying for notifications according to the push or pull model. If there is an appropriate indication for the type of notification received, the method continues to step 1006. At 1006, the display control module configures the controller(s) 920(1)-920(n) to provide current to the LGS(s) 901(1)-902(n) such that the LGS(s) 901(1)-901(n) illuminate the indicium in such a way as to convey the indication (e.g., the indicium pulses a green color to signify an incoming call, an envelope shape appears in the indicium, a portion of the indicium is illuminated to indicate battery level, the indicium pulses to signify a sleep state of the device). This method may be employed regardless of the state of another display of the device or even the state of the device (e.g., notifications may be displayed during a sleep state, notifications may be displayed even when another display is off, notifications may be displayed while another display is illuminated).

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "may" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. An electronic device comprising:
    a display housing including a first side and a second side opposite the first side;
    a user display disposed at the first side of the display housing;
    an indicium portion disposed at the second side of the housing;
    a first set of light-generating sources disposed to provide illumination for the user display;
    a second set of light-generating sources disposed to provide illumination for the indicium portion; and
    a shared reflector sheet disposed between the first set of light-generating sources of the first side and the second set of light-generating sources of the second side of the display housing, such that:
        light emitted from the first set of light-generating sources is prevented from illuminating the indicium portion, and
        light emitted from the second set of light-generating sources is prevented from illuminating the user display,
    wherein all of the second set of light-generating sources are disposed on a substrate in a pattern corresponding to a perimeter of a shape of the indicium portion.

2. The electronic device according to claim 1, wherein the substrate is a first substrate, and
    wherein the first set of light-generating sources are disposed in a patterned array across a second substrate positioned adjacent a surface of the shared reflector sheet.

3. The electronic device according to claim 1, wherein the substrate is a first substrate, and
    wherein the second set of light-generating sources are disposed across a second substrate positioned adjacent a portion of the shared reflector sheet.

4. The electronic device according to claim 1, further comprising:
    one or more processors; and
    one or more computer-readable media storing computer-executable instructions that, when executed by the one or more processors, cause the one or more processors to perform operations comprising:
        illuminating, with the first set of light-generating sources, the user display in response to a determination that the user display is in an active state, and
        upon receiving a predetermined activation signal, illuminating, with the second set of light-generating sources, the indicium portion independent of an activation of the first set of light-generating sources.

5. The electronic device according to claim 1, wherein the second set of light-generating sources includes unpackaged LEDs.

6. The electronic device according to claim 1, wherein a profile height of the substrate and the second set of light-generating sources is less than 0.25 mm.

7. The electronic device according to claim 6, wherein the profile height of the substrate and the second set of light-generating sources is less than 0.15 mm.

8. The electronic device according to claim 1, further comprising a light guide within an interior of the indicium portion,
    wherein the second set of light-generating sources illuminate towards the interior.

9. An electronic device comprising:
    a display housing including a first side and a second side opposite the first side;
    a user display disposed at the first side of the display housing;
    an indicium portion disposed at the second side of the housing;
    a first set of light-generating sources disposed to provide illumination for the user display;
    a second set of light-generating sources disposed to provide illumination for the indicium portion;
    a shared reflector sheet disposed between the first set of light-generating sources of the first side and the second set of light-generating sources of the second side of the display housing;
    one or more processors; and
    one or more computer-readable media storing computer-executable instructions that, when executed by the one or more processors, cause the one or more processors to perform operations comprising:
        illuminating, with the first set of light-generating sources, the user display in response to the user display being in an active state, and
        upon receiving a predetermined activation signal, illuminating, second set of light-generating sources, the indicium portion independent of an activation of the first set of light-generating sources.

10. The electronic device according to claim 9, wherein the display housing is a lid of a laptop computing device.

11. The electronic device according to claim 9, wherein the display housing is a smart phone.

12. The electronic device according to claim 9, wherein the display housing is a tablet computing device.

13. The electronic device according to claim 9, wherein the second set of light-generating sources are disposed in a pattern corresponding to a perimeter of the indicium portion, and
    wherein a light emission direction of the second set of light-generating sources is directed toward an interior of the perimeter of the indicium portion.

14. The electronic device according to claim 9, wherein the second set of light-generating sources are disposed on a flexible film substrate in an array pattern that spans across an entirety of a perimeter of the indicium portion, and wherein a light emission direction of the second set of light-generating sources is directed toward an exterior of the indicium portion.

15. The electronic device according to claim 9, wherein the second set of light-generating sources are disposed on a flexible film substrate so as to be along one or more sides of a perimeter of the indicium portion, and wherein a light emission direction of the second set of light-generating sources is directed toward an interior of the perimeter of the indicium portion.

16. The electronic device according to claim 9, the operations further comprising:

receiving a notification, and relaying the notification to a user of the electronic device via illumination of the indicium portion independent of a state of illumination of the user display.

17. The electronic device according to claim 16, wherein the illumination of the indicium portion in response to the notification is displayed in the indicium portion according to a predetermined pattern associated with the notification.

18. The electronic device according to claim 9, wherein the first set of light-generating sources and the second set of light-generating sources have a maximum length of at most 300 microns and a height between 50 and 80 microns.

19. The electronic device according to claim 9, wherein the first set of light-generating sources and the second set of light-generating sources include unpackaged LEDs.

20. The electronic device according to claim 19, wherein the second set of light-generating sources are spaced from the indicium portion by a diffusing offset distance of at most 0.05 millimeters, the diffusing offset distance being measured as a distance between an emission surface of the second set of light-generating sources and a viewing surface of the indicium portion.

* * * * *